United States Patent
Heberley et al.

(10) Patent No.: US 6,914,854 B1
(45) Date of Patent: Jul. 5, 2005

(54) METHOD FOR DETECTING EXTENDED RANGE MOTION AND COUNTING MOVING OBJECTS USING AN ACOUSTICS MICROPHONE ARRAY

(75) Inventors: Jeffrey R. Heberley, E. Stoudsburg, PA (US); Myron M. Hohil, Parsippany, NJ (US); Jay W. Chang, Demarest, NJ (US); Anthony G. Rotolo, Middletown, NJ (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 76 days.

(21) Appl. No.: 10/604,188

(22) Filed: Jun. 30, 2003

Related U.S. Application Data

(60) Provisional application No. 60/320,214, filed on May 23, 2003, and provisional application No. 60/319,652, filed on Oct. 29, 2002.

(51) Int. Cl.[7] ............................................. G01S 3/80
(52) U.S. Cl. ......................................................... 367/119
(58) Field of Search ................................. 367/119, 128, 367/135

(56) References Cited

U.S. PATENT DOCUMENTS 4,991,147 A * 2/1991 Remley et al. ............. 367/127

* cited by examiner

Primary Examiner—Daniel Pihulic
(74) Attorney, Agent, or Firm—Michael C. Sachs; John F. Moran

(57) ABSTRACT

An acoustic array platform comprising multiple spaced microphones and associated processing electronics/ algorithms projects distinct beams in a chosen look direction across which moving objects such as vehicles pass. These moving objects are accurately detected, classified and counted at extended ranges. The acoustic microphone array employs optimized beamforming to create specially focused listening directions that function as a "motion detector" and "trip line counter". Algorithms detect and confirm the appropriate presence of objects moving through the beams and perform other algorithmic tests to verify that the object is a valid object to be counted. The proposed approach is realized with modest sized acoustic arrays and a reasonable number of microphones by employing an adaptive beamforming algorithm that achieves enhanced directivity in a principal look direction and which significantly reduces the effects of interferers outside the precise steering direction of the "trip line".

25 Claims, 9 Drawing Sheets

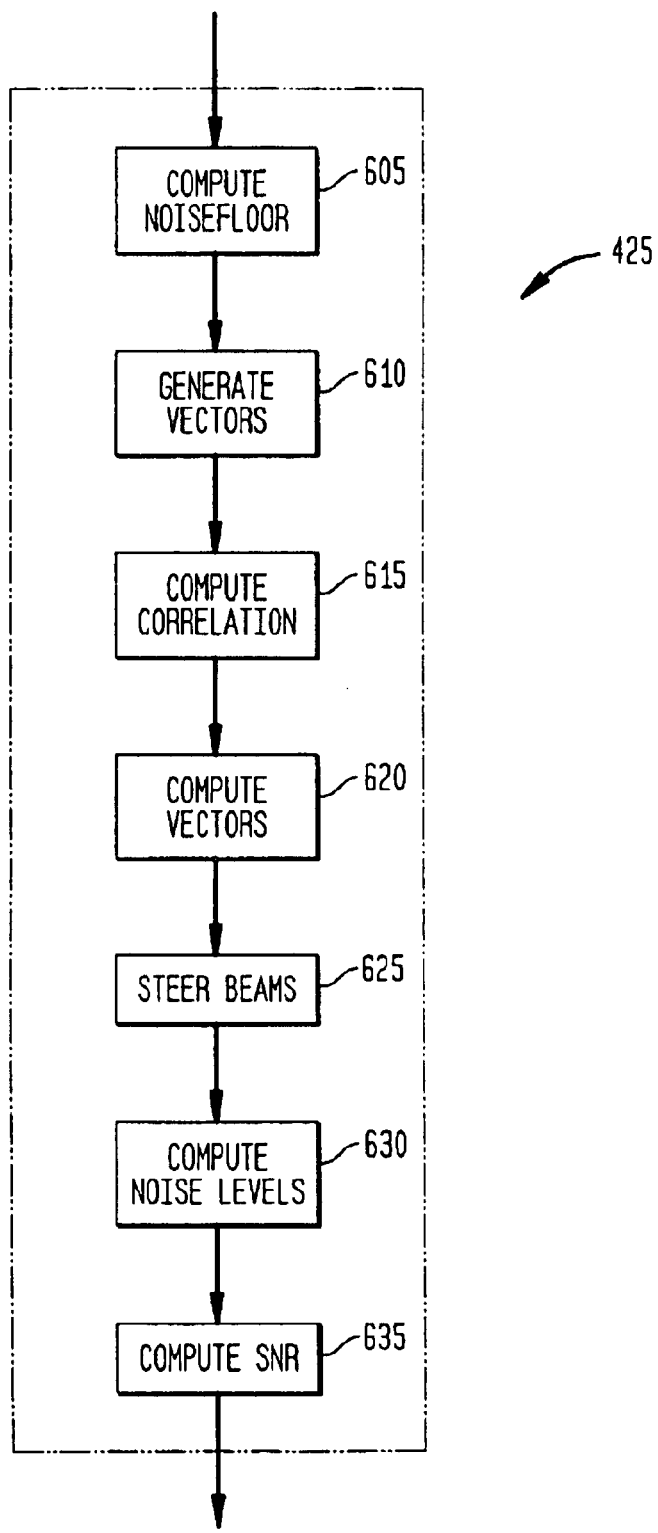

METHOD FOR DETECTING EXTENDED RANGE MOTION AND COUNTING MOVING OBJECTS USING AN ACOUSTICS MICROPHONE ARRAY

CROSS REFERENCE TO RELATED APPLICATIONS

This application claims benefit under 35 USC 119(e) of provisional application 60/319,652 filed Oct. 29, 2002 and of provisional application 60/320,214 filed May 23, 2003, the entire file wrapper contents of which provisional applications are herein incorporated by reference as though fully set forth at length.

FEDERAL RESEARCH STATEMENT

The invention described herein may be made, used, or licensed by or for the for U.S. Government for U.S. Government purposes.

BACKGROUND OF INVENTION

1. Field of the Invention

This invention generally relates to detection of moving targets, and more specifically to detection of moving targets using one or more acoustic arrays. More particularly, this invention pertains to a system that uses conventional and/or adaptive beamforming to locate and count multiple targets in dynamic, noisy, and highly mobile environments.

2. Background of the Invention

Acoustic over watch sensor systems are used to provide extended range surveillance, detection and identification for force protection and tactical security on the battlefield. A network of over watch sensors remotely deployed in conjunction with a central processing node (or gateway) can provide early warning and assessment of enemy threats, near real-time situational awareness to commanders, and may reduce potential hazards to the soldier. When a network of acoustic sensors is used, measurements from distributed arrays are reported to a "fusion" center that sorts the sensor measurements and estimates the location and kinematics of identified sources of interest.

An essential requirement for unattended acoustic sensors systems used for battlefield surveillance is the capability to locate and track multiple targets in dynamic, noisy, and highly mobile environments. Today's state-of-the-art acoustic sensor systems report measurements from diverse sources comprising targets of interest, background noise (or clutter), and noise due to local environmental conditions. However, complex data association logic is required to sort out sensor measurements into general categories such as targets of interest, sources that are not of interest and false detections that cannot be correlated over time.

Target tracking in noisy, cluttered environments is treated as a problem in associating detected target observations with target tracks. These observations could be comprised of false target detections or an unknown number of actual target detections. Consequently, the performance of these methods is fundamentally dependent on the system's target detection capability.

Conventional and adaptive beamforming algorithms are commonly used to enhance the directivity and direction finding capability of a single sensor array and are essential in realizing the performance benchmarks required in detecting and localizing remote targets of interest. These spatial filtering methods allow position-related measurements such as bearing to a target to be computed from the steered response of an acoustic array. One of the most challenging areas of the multi-sensor performance problem is the beam-pointing control of an acoustic array in dense multiple target environments, where closely spaced targets, highly maneuvering targets, and targets in the presence of multi-path should be resolved. Factors that contribute to this challenge are finite sensor resolution, inconsistent beam shape, false alarms, complex target formations, and the mobile nature of target signatures.

The use of multiple acoustic sensors in array configurations for the purpose of forming specific narrow look directions (beamforming) and using such means to extend the detection range of individual microphones has been implemented and tested for land acoustic vehicle detection. Such implementations have been successful in identifying the presence of multiple targets in the local vicinity of the acoustic array by measuring multiple bearing directions to each target with respect to the acoustic array. Some implementations also determine a passive range estimation to target. By combining this passive range estimation with bearing to target information, multiple tracks to targets can be maintained. The number of targets that can be effectively tracked by an acoustic array using adaptive beamforming methods is widely recognized as the quantity (N−1) where N is the number of microphones in the array. Consequently, if more than N−1 targets enter the surveillance area, confusion potentially exists and the ability to individually track each vehicle cannot be maintained.

In practice, a basic problem of accountability occurs when a count for the number of targets that pass by the vicinity of the acoustic array is desired. Often a user must examine the ongoing real-time output of the sensor array to determine a best guess for the number of vehicles that were tracked during any particular timeframe. Therefore, a man-in-the-loop is required to perform very careful examination of the ongoing information. Often, the tracks are not maintained continuously and without high fidelity (depending on range from the array and spacing of targets). Consequently, it is difficult to know which tracks should be "counted".

If more than one acoustic array is required to cover a greater area, accountability of target count becomes very difficult. To mitigate this issue, multiple microphone arrays are generally networked together to improve the effective area of coverage. Networked acoustic arrays that combine their respective bearing information to determine more accurate target tracking (using triangulation) should agree on which targets they are tracking from remote locations. Deciding if the target is the same target being viewed from multiple remote locations is inherently difficult, often creating "ghost" targets, which are targets that don't exist.

The sharing of tracking information from multiple sensor sites requires that each site resolve individual targets. In scenarios where targets are closely spaced or moving abreast relative to a sensor node, the sensors do not "hear" the same target over portions of the track through the sensor field, therefore, tracking and target counting accountability is very difficult.

What is needed are signal processing techniques that would provide over watch sentries with the ability to autonomously and remotely count the number of vehicles passing through a predetermined field of view. The need for such a system has heretofore remained unsatisfied.

SUMMARY OF INVENTION

The present invention satisfies this need, and presents a method for detecting extended range motion and counting moving objects (sound sources) using an acoustics microphone array. The acoustic microphone array employs an optimized beamforming technique to create specially focused listening directions that function as a "motion detector" and "trip line counter". Algorithms detect and confirm the presence of objects moving through the beams and perform other algorithmic tests to verify that the object is a valid object and should be counted. In addition, algorithms verify valid directional information of the key target features within the acoustic beams.

The present method represents a new approach to the problem of counting targets using one or more acoustic arrays and can effectively count targets without human intervention. The present method allows the addition of an "acoustic trip line counter" around a surveillance area as a "building block" for each acoustic node placed in the area. The user implements the present method by selecting a look direction across which the "motion detection" and resulting counting may occur. Two or more acoustic arrays that look down the same avenue can extend the range of the "acoustic trip line" to cover large battlefield frontage. Measurements are partitioned into sets of observations and are confirmed so that background noise and other false detections are rejected while estimates for the number of targets can be computed. While the present invention is discussed in terms of vehicles in a battlefield situation, the present invention can be applied to moving objects in any scenario.

In many projected remote sensor deployment concepts, there exists a need to form a perimeter around the sensor surveillance area. Implementation of the present method allows the formation of an effective surveillance perimeter using multiple acoustic sensor nodes. The information from the present method is useful as a powerful stand-alone technique to count targets in specific surveillance zones. The present method may also be added to existing system level tracking solutions implemented for the purpose of better defining the location of multiple vehicles in confusing multiple vehicle scenarios.

The present method is also a solution for resolving track loss deficiencies inherent to tracking individual vehicles in cluttered multiple target environments within the proximity of the closest point of approach to an acoustic sensor. As an example, the present method may be used in conjunction with an array baseline comparable to that of the integrated acoustic sensor system (IAS) developed by Textron Systems Division.

The present method introduces a way of alleviating uncertainties regarding the number of vehicles being tracked at closest point of approach based solely on individual sensor information. The performance of the present method is ensured using signal processing techniques that provide the capability of both detecting the presence of every vehicle that approaches an acoustic array and obtaining a highly accurate vehicle count.

In dense target environments, the detected acoustic signals are contaminated by the engine noise from other vehicles that are often louder than the target of interest. The problem of separating signals from individual targets in multiple target scenarios requires a robust adaptive approach to suppress interference from other vehicles closely spaced to the target of interest. The present method solves this issue through an acoustic "trip line" algorithm that addresses problems with the array's limited resolution due to its finite aperture. The method also introduces noise suppression that excludes undesired signals and overcomes the inability to account for source motion.

An implementation of the "trip line" approach of the present method utilizes both conventional and adaptive beamforming algorithms that form a refined spatial filter to capture the harmonic content (key features) of individual targets that pass through a fixed line in bearing. The power from narrowband signal components in both the conventionally and adaptively formed beams is monitored so that a target crossing a line of bearing through one of the designated beams triggers the event of a target count. Conventional beamforming is used to "coarsely" filter and estimate the direction of arrival of narrowband acoustic sources impinging on the circular array of microphones. The "fixed" beam pointing and highly selective spatial filtering is achieved using a minimum variance distortionless response (MVDR) beamforming algorithm in which the spatial filtering function is frequently updated in response to changes in the local environment. This adaptive weight computation ensures a beamformer response that approaches the theoretically optimum solution by reducing (and often canceling) the effects of interfering signals. Significant performance advantages are gained using the adaptive beamforming algorithm. The adaptive strategy also accounts for movements in source direction by frequently updating the spatial characteristics of the array to obtain an optimal signal to noise gain in the direction of the target.

BRIEF DESCRIPTION OF DRAWINGS

The various features of the present invention and the manner of attaining them will be described in greater detail with reference to the following description, claims, and drawings, wherein reference numerals are reused, where appropriate, to indicate a correspondence between the referenced items, and wherein:

FIG. 5 is a process flow chart illustrating a method of operation of the adaptive beamformer module of the moving target counting algorithm.

DETAILED DESCRIPTION

Figure 1:
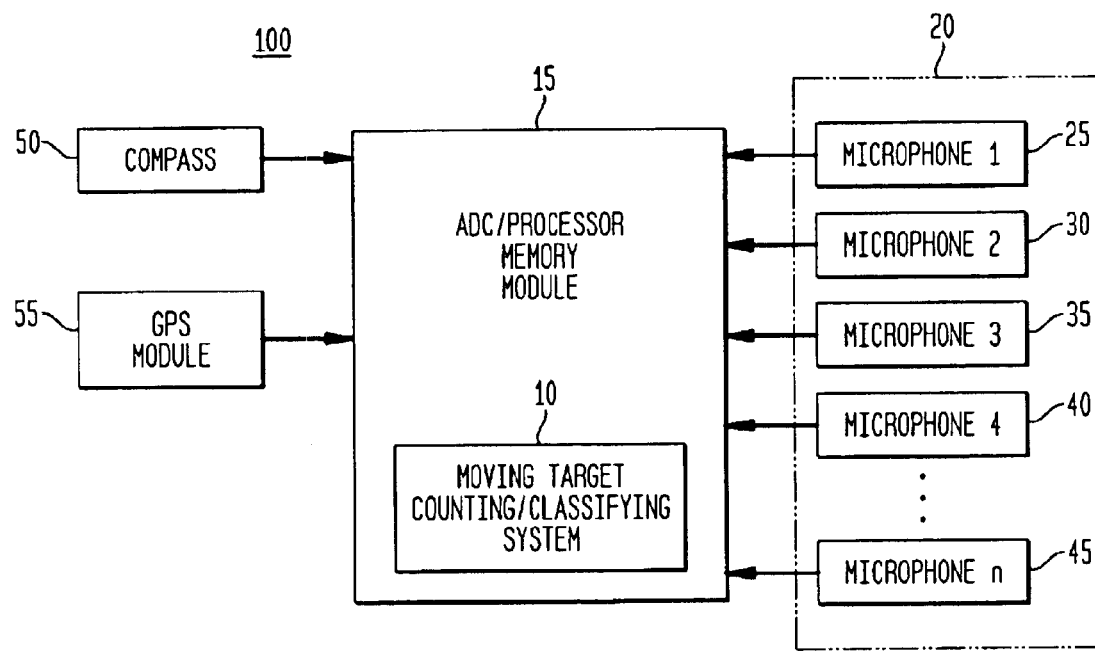
FIG. 1 is a schematic illustration of an exemplary operating environment in which a moving target counting method of the present invention can be used.

FIG. 1 illustrates an exemplary high-level architecture of an acoustic sensor system comprising a moving target counting system 10 that utilizes an algorithm for detecting extended range motion and counting moving objects using an acoustics microphone array. System 10 includes a software programming code or computer program product that is typically embedded within, or installed on an Analog to Digital Converter (ADC)/Processor memory module 15. The microphone array 20 comprises a set of microphones such as microphone 1—(#25), microphone 2—(#30), microphone 3—(# 35), microphone 4—(#40), up to and including microphone n—(# 45). The microphone array 20 provides acoustic information to system 10 for detecting, tracking, counting and classifying targets. The compass 50 and GPS module 55 also provide information to the system 10 for location and steering purposes.

An acoustic sensor system can be used to perform direction finding using a fixed array strategy to optimize the filtering of microphone array 20 in a steered focus direction.

Beamforming generally used to steer microphone array 20 in both azimuth and elevation and measure the resulting output power from a finite set of sampled data. The spatial filtering operation passes signals from fixed directions of interest and rejects noise from all other directions. In frequency domain beamforming, the response of microphone array 20 is steered by forming a linear combination of the sensor outputs $$y(t) = \sum_{m=1}^{M} w_m^n x_m(t) = w^H x(t) \quad (1)$$

where w #$c^n$ is the weight vector of spatial filter coefficients and x is the vector obtained from the Short Time Fourier Transform (STFT) of the sampled signal x(t) computed at discrete frequency bins.

Given a set of samples x(t) observed over a time interval T, the output ppower is measured as:

$$P(w) = \frac{1}{T}\sum_{t=1}^{T}|y(t)|^2 = \frac{1}{T}\sum_{t=1}^{T} w^H x(t)x^H(t)w = w^H Rw \quad (2)$$

where R is the signal spatial covariance matrix R=E{x(t)xE$^H$(t)} and E{·} denotes the statistical expectation. In practice, the signal covariance matrix is not known and should be estimated from the spectral data:

$$\bar{R} = \frac{1}{T}\sum_{t=1}^{T} x(t)x^H(t). \quad (3)$$

A conventional beamformer (CBF) steers a single beam in the direction of a signal of interest and places nulls in fixed locations independent of interfering noise sources. Let á(#)#$C^n$ denote the response of a microphone array 20 of arbitrary geometry to a plane wave of unit amplitude arriving from some focus direction #. A measurement of the output of microphone array 20 x(t) #$C^n$ to a narrowband source s(t) in the far field of the microphone array 20 is given as:

$$x(t)=á(\phi)s(t)+\varsigma(t). \quad (4)$$

The additive noise ς(t) represents undesired signals. For the conventional beamformer, the output described in (1) is given as $$y(t)=w^H á(\phi)s(t)+w^H \varsigma(t). \quad (5)$$

The problem of maximizing the output power then becomes $$\max_w E\{w^H x(t)x^H(t)w\} = \quad (6)$$

$$\max_w w^H E\{x^H(t)\}w = \max_w \{E|s(t)|^2 |w^H á(\varphi)|^2 + \sigma^2 |w|^2\}.$$

The spatial coefficients are computed at discrete frequencies to ensure that the weighted signal components from waves propagating over the microphone array 20 may add constructively with unit magnitude and zero phase. This property is referred to as the distortionless response of a microphone array 20 and is satisfied when the gain of the weighed response is such that $$|W^H á(\phi)|=1. \quad (7)$$

In general, values for the weights that minimize the noise gain $w^H E\{\varsigma(t)\varsigma^H(t)\}w$ are desired. For the conventional beamformer, the noise ς(t) is assumed to be uncorrelated among microphones.

A non-trivial solution is obtained when the norm of the weight vector is constrained to unity when performing the maximization in Equation 6, resulting in an expression for the weight vector:

$$w = \frac{á(\varphi)}{[á^H(\varphi)á(\varphi)]^{\frac{1}{2}}}. \quad (8)$$

The spatial spectrum is found by substituting Equation 8 into Equation 2:

$$P(\varphi) = \frac{á^H(\varphi)\bar{R}á(\varphi)}{á^H(\varphi)á(\varphi)} \quad (9)$$

where $\bar{R}$ is defined in Equation 3. The conventional beamformer maximizes the output power in Equation 2 for a desired signal direction and places nulls in fixed locations independent of interfering noise sources.

In general, system 10 requires the ability to resolve the power of two acoustic sources spaced closer than the natural beam width of the microphone array 20. This is accomplished by implementing an MVDR beamformer that is capable of adapting to the noise levels found within multiple target environments using microphone array 20. Using this approach, the weights are chosen to minimize the beamformer power in Equation 2 subject to the distortionless response criteria in Equation 7. Assuming that the beamformer response á(#) and the spatial covariance matrix R=E{x(t)x$^H$(t)} are known, the weights may be chosen as the optimal solution of minimize P(w)

such that $w^H a(\phi)=1$ (10)

where P(w) is defined in Equation 2. The MVDR beamformer makes use of an estimated signal covariance matrix $\bar{R}$ (defined in Equation 3) in place of R for the output power in (10). The resulting beamformer is chosen as the solution to minimize $w^H \bar{R} w$ such that $w^H a(\phi)=1$ (11)

The optimal value for the weight vector w can be found using a complex Lagrange multiplier # in conjunction with the unconstrained cost function $$J(w)=w^H \bar{R} w + Re[\lambda(w^H á(\phi)-1)]$$

and minimizing over w and #. The necessary conditions are found to be $$\partial J/\partial w = \bar{R}w + \lambda á(\phi)=0 \text{ and } \partial J/\partial \lambda = w^H á(\phi)-1=0$$

that when combined yield the analytical solution:

$$w_{MVDR} = \frac{\overline{R}^{-1}\dot{a}(\varphi)}{\dot{a}^H(\varphi)\overline{R}^{-1}\dot{a}(\varphi)} \qquad (12)$$

The MVDR spatial spectrum is found by inserting the expression for $w_{MVDR}$ into Equation 2:

$$P(\varphi)_{MVDR} = \frac{1}{\dot{a}^H(\varphi)\overline{R}^{-1}\dot{a}(\varphi)} \qquad (13)$$

The MVDR beamformer minimizes the power contribution of the noise and any signals coming from directions other than the direction of interest #, while maintaining a fixed gain in the desired focus direction. In this way, nulls are automatically placed in directions of interfering noise sources while a distortionless response is maintained in a prescribed look direction. Although the resolution of the beamformer is still dependent on the aperture of the microphone array 20 and signal to noise ratio (SNR) of both the source and interfering signal components, the spectral leakage from closely spaced sources is generally reduced.

The adaptive MVDR beamforming solution of system 10 (also referenced as adaptive beamforming or adaptive beamformer) measures the spatial covariance matrix rather than making assumptions about the noise. The matrix $\overline{R}$ in system 10 varies due to the dynamic nature of the desired signal components and to the noise typically found in a multiple target environment. In general, the estimate for $\overline{R}$ can be time averaged as in Equation 3 to get a better estimate of the signal and to effectively reduce the noise. However, the time-varying nature of the data leads to an estimate for $\overline{R}$ that is susceptible to errors when a small number of samples are averaged in the computation.

When the number of averages is less than the number of elements in microphone array 20, the estimate for the spatial covariance matrix results in an ill conditioned (or singular) matrix. When this occurs, the weights are adjusted in such a way that the noise cancels the signal even when the look constraint is satisfied. Nevertheless, it is desirable to continuously update the spatial characteristics of the microphone array 20 using the least amount of averages to account for movement in source direction. The object is to maintain good noise suppression of interfering signals even if the signal of interest and interfering noise occupy the same temporal frequency band. This problem is inherent to multiple target tracking applications when similar vehicles are tracked over time.

The MVDR beamformer is commonly desensitized to estimation errors by injecting a small amount of white noise along the diagonal elements of $\overline{R}$ to ensure its invertability. The process of adding a scaled identity matrix to the covariance estimate is typically referred to as regularization or diagonal loading. The degradation in noise suppression that results for large $\overline{R}^{-1}$ is resolved by adding a constraint on the noise response of the beamformer in the optimization problem Equation 11 as:

minimize $w^H\overline{R}w + \mu w^H w$ such that $w^H a(\phi) = 1$ \qquad (14)

where $\mu > 0$ is a fixed parameter used to detune the beamformer response by penalizing large values of w. The solution is written as $$w_{MVDR\_DL} = \frac{(\overline{R}+\mu I)^{-1}\dot{a}(\varphi)}{\dot{a}^H(\varphi)(\overline{R}+\mu I)^{-1}\dot{a}(\varphi)} \qquad (15)$$

System 10 uses a regularization parameter $\mu$ that is adjusted relative to the average background noise level computed at each sensor element. A rank order filter assigns the noise level around the frequency in question as the 30$^{th}$ percentile value of sorted spectral magnitudes at each frequency bin within a 25 Hz window. The actual value of $\mu$ is selected to be within 5 dB of the background noise value that is averaged over the number of microphones in the microphone array 20.

Figure 2:
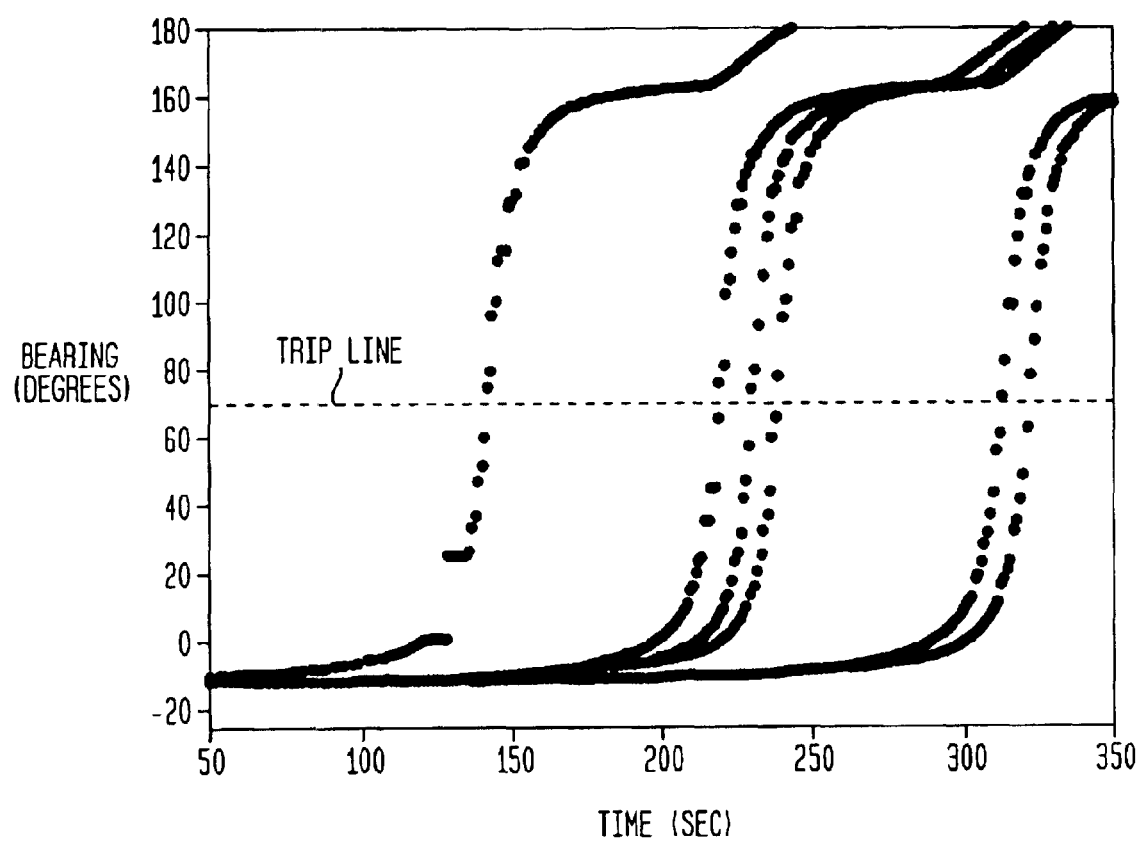
FIG. 2 is a graph illustrating the use of a trip line by the moving target counting system of FIG. 1.

The target counting algorithm of system 10 takes advantage of the capability of a microphone array 20 to detect the presence of vehicles by measuring the harmonic content in a pre-determined "look-direction" along a fixed line of bearing (as illustrated in FIG. 2). The "trip line" is formed with a narrow earn pointing response that is derived from the conventional and adaptive response of the microphone array 20 to obtain automatic counts to individual targets passing through a fixed line in bearing. An adaptive beamformer steers deep nulls to suppress harmonic content in the directions of interferers while bearing estimation using a conventional fixed-beam method is used to compute the direction of arrival of narrowband sources that are passed from the predetermined "look-direction". The power in beams steered in the "trip line" direction is monitored such that targets crossing through the predetermined steering angle automatically trigger the event of a target count.

The adaptive "trip line" beam is pointed in the direction of a target's closest point of approach to the sensor since the range to the target is the shortest and the target is generally loudest at this point. In addition, the highest rate of change in bearing to the target occurs at this time. The acoustic sensors detect the presence of a target by measuring the harmonic content in the prescribed "look-direction". The auxiliary logic of system 10 is used to ensure a minimum number of false counts. The adaptive trip line is made possible through the implementation of an MVDR beamformer that allows for integrated main lobe and side lobe cancellation determined from the nature of the source signal (s). When a vehicle moves into the path of the steered beam, sound energy created by the passing vehicle passes undistorted in the "trip line" direction due to the enhanced directivity of the beamformer in this direction. The rationale for this response is derived directly from the definition of the MVDR beamformer (Equation 11) that states that the beamformer should pass signals undistorted from the direction in which the beam is pointed while minimizing the total beam power in all directions that are not in the look direction may be automatically suppressed by the beamformer to minimize the total beam power.

Through the significant functional capability of system 10, an acoustic microphone array 20 can be positioned in a remote location off the expected path that multiple vehicles may traverse. The user can then select an intended look direction to make a count of vehicles as well as verify or classify the vehicle type. The functional improvement is provided by combining an acoustic feature extractor with detailed location information of the vehicle that together verify the presence of a vehicle in the specific acoustic beamforming "look direction". Multiple acoustic beams are formed using a beamforming technique referenced as Minimum Variance Distortionless Response (MVDR) or adaptive beamforming, which provides directed narrow acoustic look directions with the least amount of noise interference from surrounding sources not in the beamformer look direction. The use of multiple beams is intended to provide additional confidence of the continuity of the vehicle motion through the counting "look direction" and is in essence a motion detector.

The user places the acoustic microphone array 20, comprising n number of microphones and uses the algorithm of system 10 to electronically steer the beams into the desired look direction or path across which vehicles may be counted. The range of the system is proportional to the number of microphones in the acoustic microphone array 20. Many configurations of the acoustic microphone array 20 are possible to produce the beamformer response required for target counting. If the look direction is too wide, target counting may not be accurate. For example, the use of a 45 degree look direction works well with a 4 foot, 5 microphone array 20. The ability to form well defined beams within the look direction forms the basis of an acoustic "motion detector".

Once the vehicle enters the first beam, system 10 is automatically triggered to search again in the center beam, and then once again as the vehicle exits the outer beam. If this criteria is met, the essence of target motion detection is satisfied.

Figure 3:
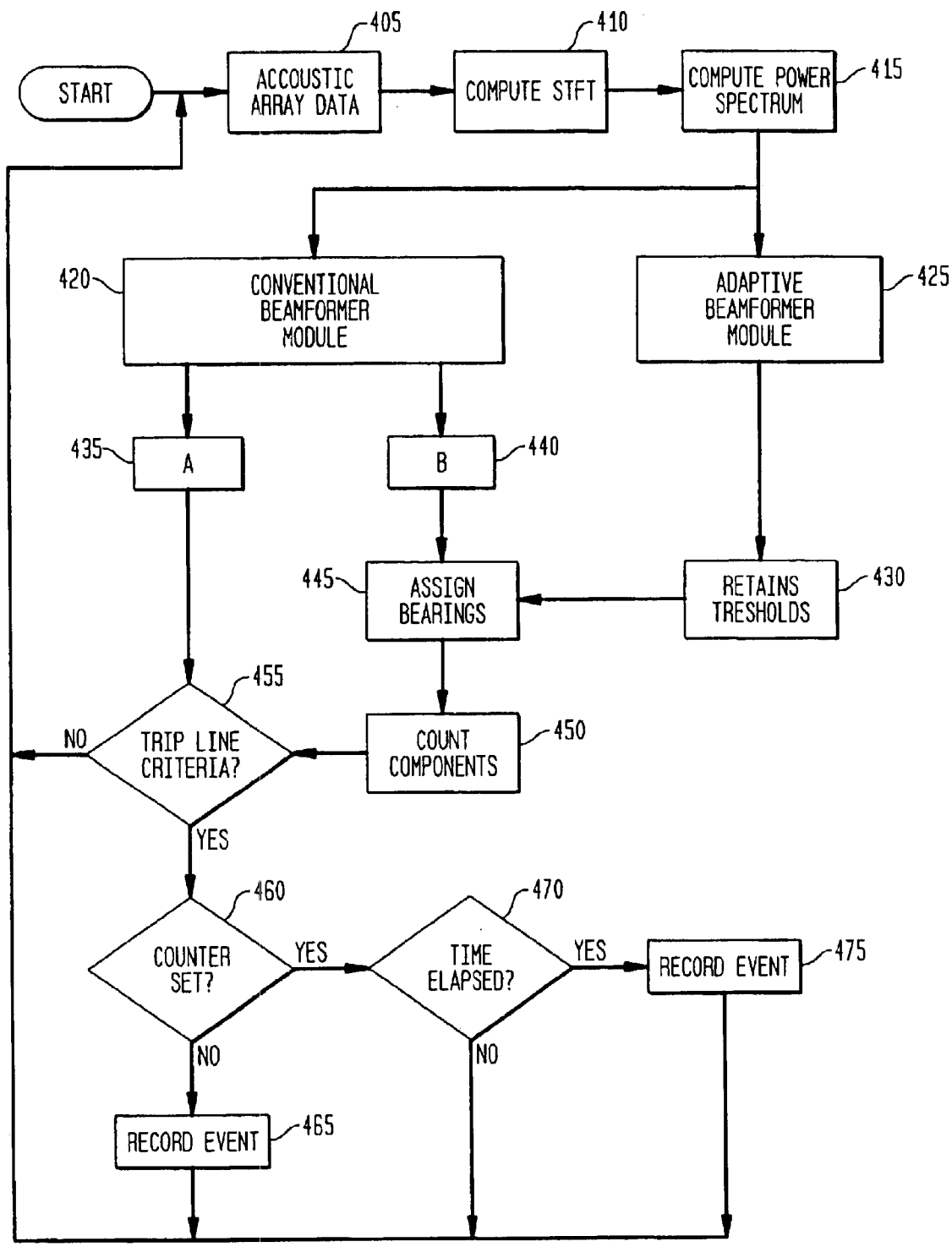
FIG. 3 is a process flow chart illustrating a method of operation of the moving target counting algorithm of FIG. 1.

A method 400 of operation of system 10 is illustrated by the process flowchart of FIG. 3. System 10 obtains sampled acoustic data from microphone array 20 at block 405. For each channel, system 10 computes the short time Fourier Transform (STFT) at block 410. At block 415, system 10 computes the power spectrum for each channel. The power spectrum computed at block 415 is used by both the conventional beamformer module 420 and the adaptive beamformer module 425. The method of the conventional beamformer module is illustrated in more detail in FIG. 4; the method of the adaptive beamformer module 425 is illustrated in more detail in FIG. 5.

The output of the adaptive beamformer module 425 is examined at block 430 and all spectral components in each beam that are greater than a predetermined threshold are retained. The conventional beamformer module 420 has two outputs. Output A 435 is the bearing to the single loudest spectral component. Output B 440 comprises the bearings to all spectral components. System 10 assumes actual bearings to peaks passed by the adaptive beamformer are along the steered look direction. System 10 then correlates these peaks with components found using the conventional beamformer (output B 440) and associates peaks existing in both CBF beams and MVDR beams. At block 445, system 10 combines the bearings to all spectral components (output B 440) and the spectral components greater than a predetermined threshold (block 430) to assign bearings to spectral components.

System 10 retains spectral components within a bearing tolerance of each look direction and counts the total number of components in each direction at block 445. System 10 retains peaks in the MVDR beams that are ±$\mu$ degrees with respect to the principal look direction. System 10 also retains peaks in the MVDR trip line if they are within a tolerance of ±#° with respect to the steered trip line look direction. This tolerance determines the narrowness of the resulting trip line.

A spectral component is registered as a moving target if the trip line is triggered. The trip line is triggered when the trip line beam contains the most number of peaks (harmonic components) in comparison to all other beams steered in the MVDR response, i.e., along the principal look-directions. In addition, the difference between the tallest peak of a neighboring conventional beamforming beam and the steered direction of the trip line is <#° with respect to the trip line. System 10 determines whether the spectral component satisfies these conditions by comparing the bearing of the single loudest spectral component (output A 435) and the components within a bearing tolerance of each look direction (block 450) (decision block 455). If the trip line beam with the most harmonics is the tallest peak within a bearing tolerance of the trip line direction (decision block 455) system 10 proceeds to decision block 460. Otherwise, system 10 returns to block 405 to repeat method 400.

The conditions of decision block 455 should be satisfied consecutively for at least two frames for a count to be registered, reducing chances for false target counts. This is verified by determining whether the trip line event counter was previously set, and if so, if adequate time has elapsed since the last time the counter was set. At decision block 460, system 10 determines if the trip line event counter was previously set. If not, system 10 sets the trip line event counter, records the event (block 465) and returns to block 405 to repeat method 400. If the trip line event counter has been previously set, system 10 checks at decision block 470 whether adequate time has elapsed since the last time the trip line counter was set. If insufficient time has elapsed, system 10 returns to block 405 to repeat method 400.

If the delay since the last time the trip line counter was set is greater than a predetermined threshold, at block 475 system 10 increments the trip line event counter, records the event, and returns to block 405 to repeat method 400. Once the trip line is actuated, the bearing difference between the trip line direction and bearing estimate to the tallest peak should exceed a bearing of #° for the target to be counted. Otherwise, if the beam with the greatest number of harmonics becomes some other than the trip line beam, the counter is incremented by 1. If the trip line is not tripped by some predetermined threshold of frames after either one of the preceding conditions are satisfied, the target is counted and the counter is set.

Figure 4:
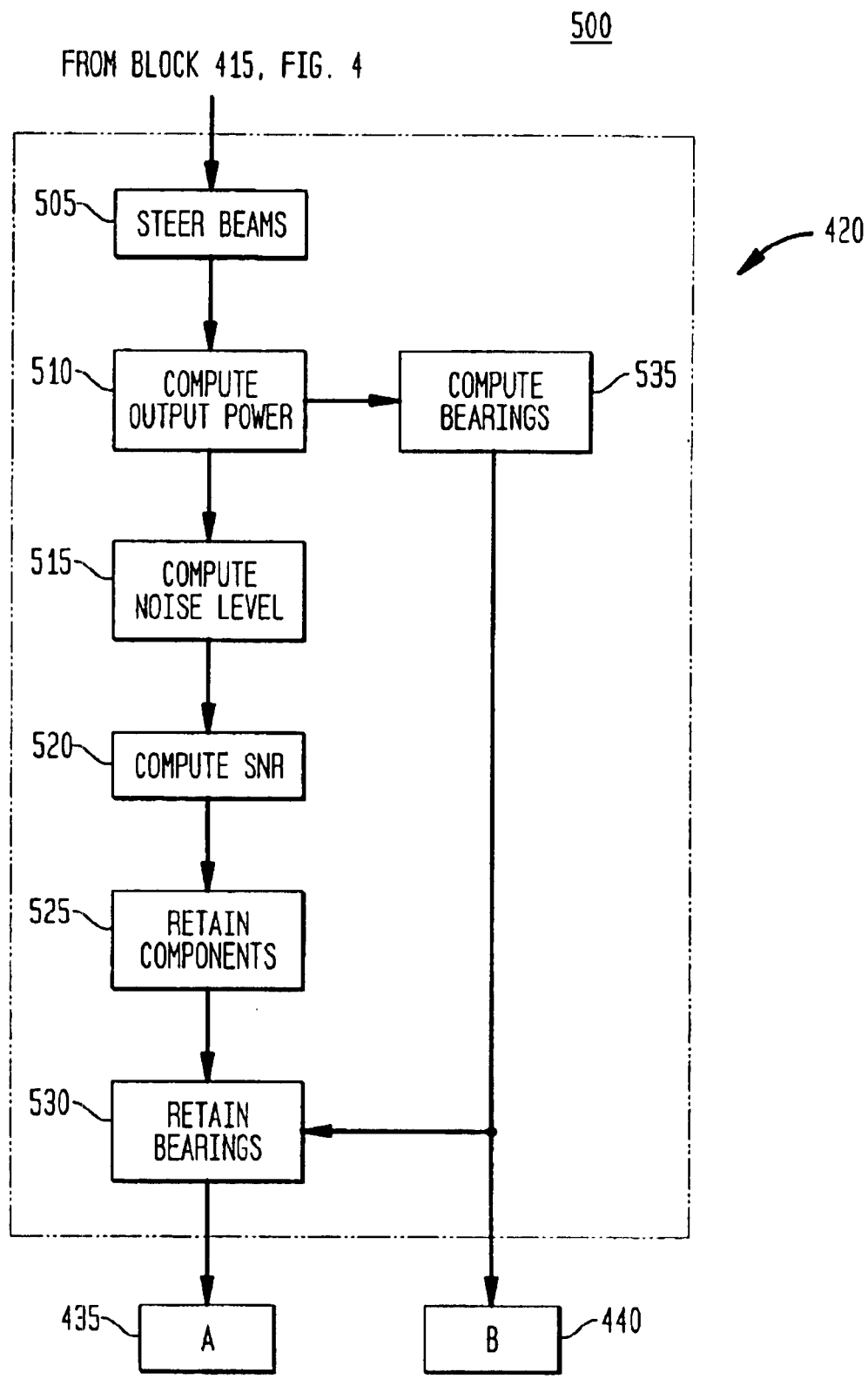
FIG. 4 is a process flow chart illustrating a method of operation of the conventional beamformer module of the moving target counting algorithm.

A method 500 of operation of the conventional beamformer module 420 is illustrated by the process flow chart of FIG. 4. The input to the conventional beamformer module 420 is the power spectrum for each channel of the microphone array 20 determined at block 415. System 10 generates steering vectors in the principal look directions for conventional beamforming $$\varphi_k = \frac{\pi}{4}k,$$

for k # {0,K,7}, and steers the beams in those principal look directions at block 505.

System 10 computes output power of the conventional beamformer module 420 in the principal azimuthal directions at block 510. For example, system 10 may compute the STFT for five channels of microphone data sampled at 1024 Hz. System 10 then, in this example, computes a 2048-point SFTF using 2 seconds of data multiplied by a 2048 point Hamming Window. The STFT data is multiplied by weight vectors (Equation 8) to obtain the output power of the conventional beamformer module 420 (Equation 9), block 510.

At block 515, system 10 computes the background noise level. System 10 computes CFAR noise floor to find spectral peaks that are #dB above the threshold level. At block 520, system 10 computes the signal to noise ration (SNR) for each spectral component. System 10 then retains components greater than a predetermined threshold at block 525, and retains bearings to the single loudest spectral component at block 530. The bearing to the single loudest spectral component determined at block 530 is the output A 435.

At block 535, system 10 uses the computational output of block 510 to ompute the bearings to all spectral components. System 10 computes bearing estimates to peaks in a range, for example, of 0.5 Hz and 249.5 Hz based on the narrowband power distribution within the 8 beams (determined at block 510). The bearings to all spectral components determined at block 535 are the output B 440 of the conventional beamformer module 420.

A method 600 of operation of the adaptive beamformer module 425 is illustrated by the process flow chart of FIG. 4. The input to the adaptive beamformer module 425 is the power spectrum for each channel of the microphone array 20 determined at block 415. The STFT frequency data calculated at block 410 is used to compute a local noise floor for each microphone element in the microphone array 20 using a rank-order filter (block 605). System 10 then generates steering vectors in the principal azimuthal directions and a "trip line" direction at block 610. At block 615, system 20 computes a correlation matrix with regularization at each frequency using spectral components across all frequencies. System 10 computes the optimum weight vectors at block 620. Using previously computed array steering vectors, system 10 steers the beams and computes the output power of the adaptive beamformer module 425 in the principal look directions and trip line direction (block 625). Background noise level or noise floor is estimated at block 630 using the same Constant False Alarm Rate (CFAR) threshold constraint as the conventional beamformer module 420. System 10 then computes the signal to noise ration for each spectral component at block 635.

As an example, consider responses from a conventional beamformer (solid line) and adaptive beamformer (dashed line) implemented for system 10 and obtained at a single snapshot in time in FIGS. 6A, 6B, 6C, 6D, 6E, 6F, 6G, 6H using previously collected signature data. At the time that the data is extracted, three T72s tanks are in close proximity to a sensor at ranges of 104 m, 50 m, and 121 m. In addition, two ZILs have passed the sensor of interest and are located at about 700 m from the array. The T-72 at closest point of approach is at a bearing of 3.7° relative to the array, while the louder of the two remaining T-72s (due to the location of the exhaust) is located at a bearing angle of 74°.

Figure 6A:
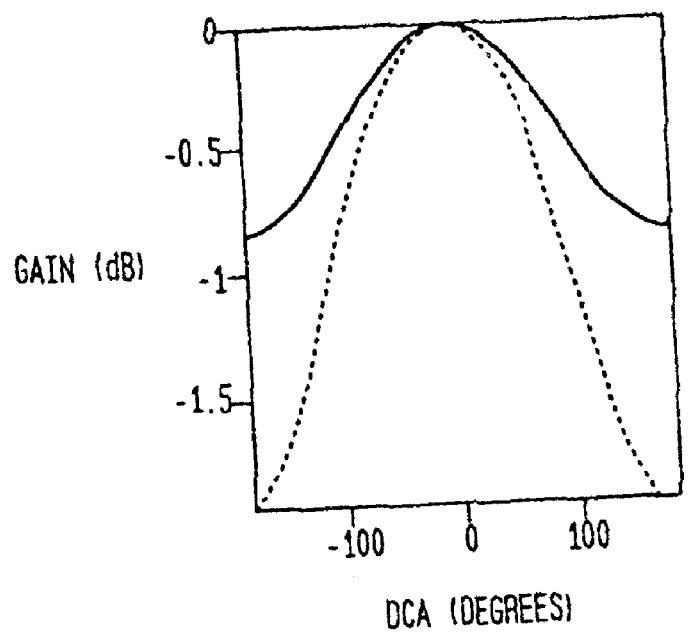
FIGS. 6A, 6B, 6C, 6D, 6E, 6F, 6G, and 6H are a series of graphs illustrating the operation of the moving target counting method in an exemplary deployment.
Figure 6B:
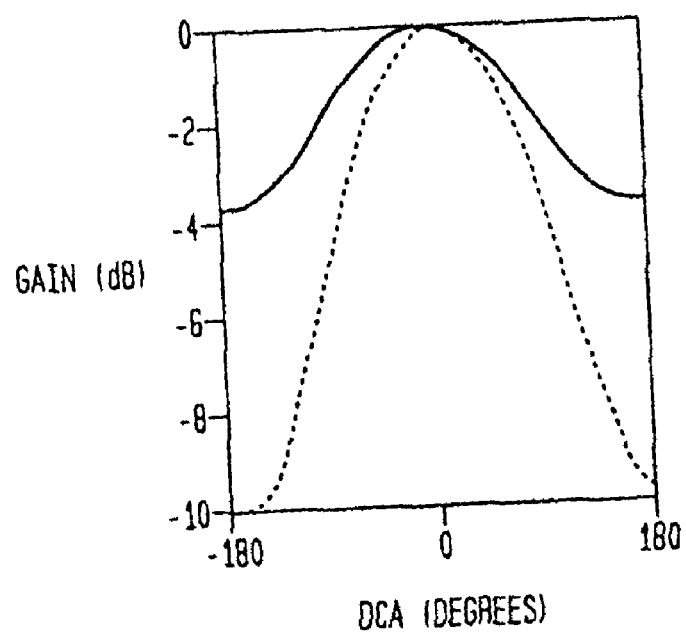
Figure 6C:
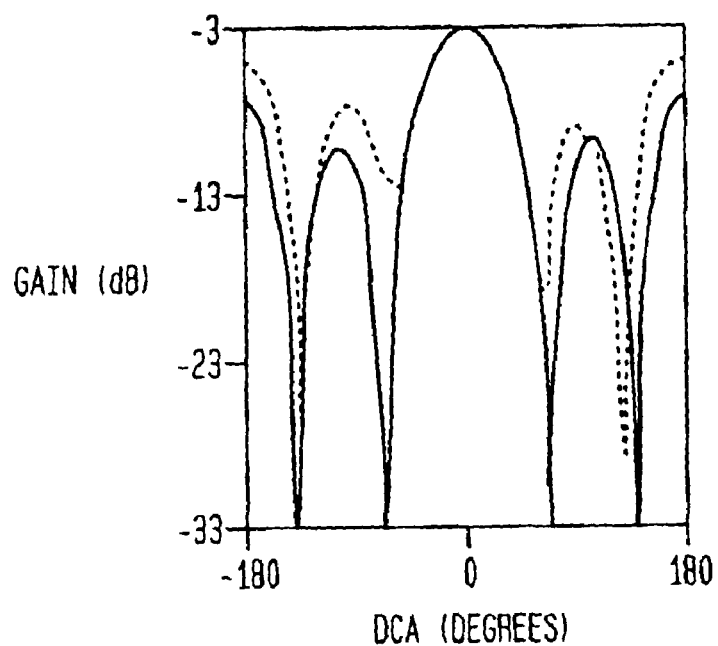
Figure 6D:
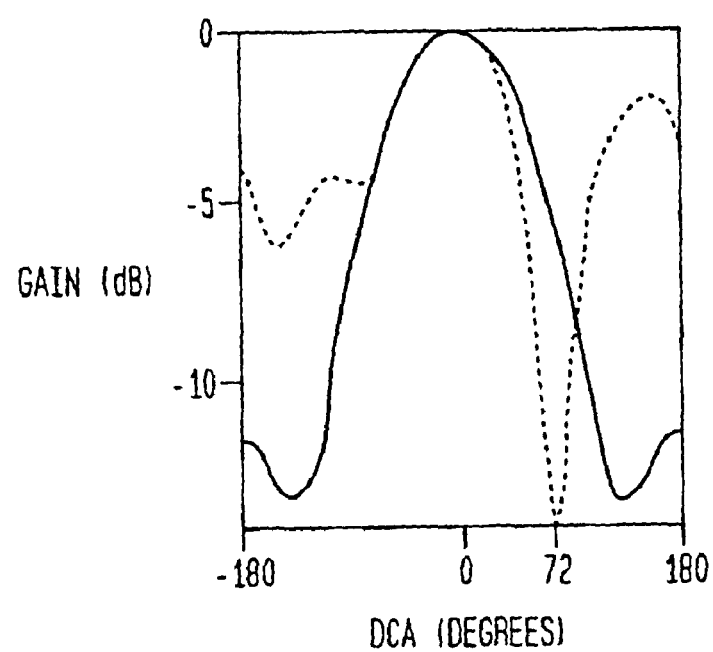
Figure 6E:
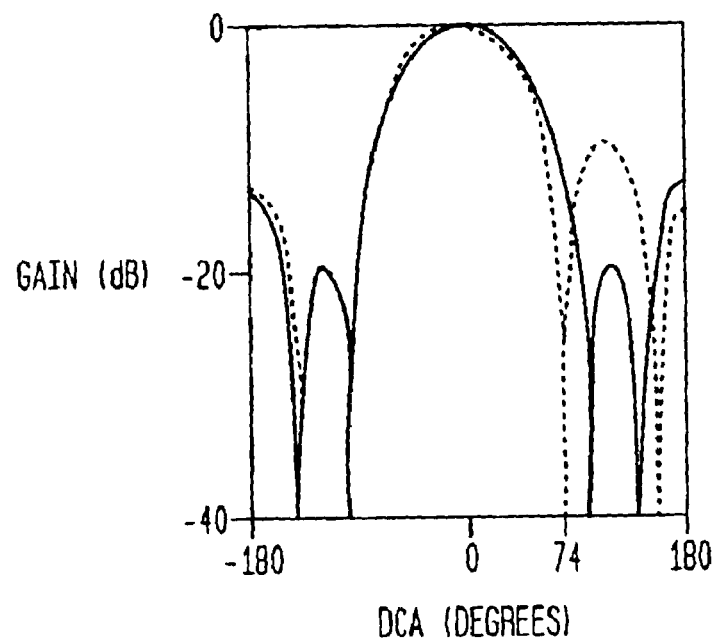
Figure 6F:
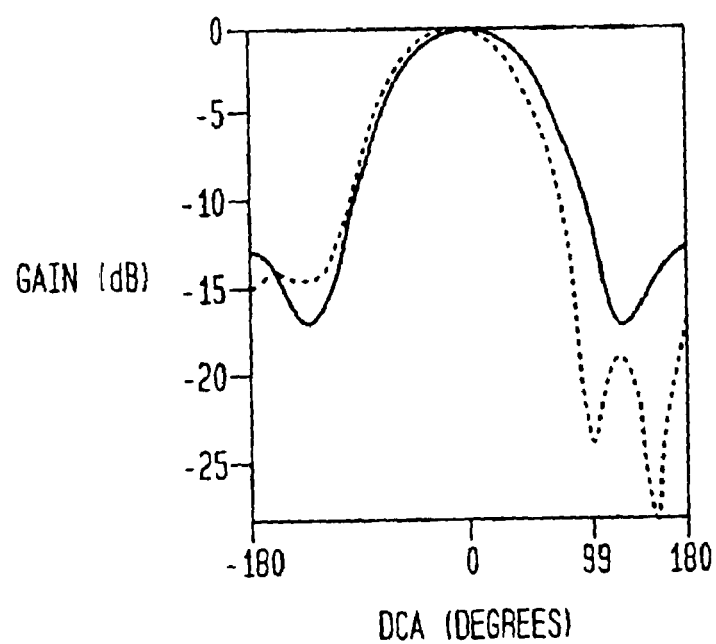
Figure 6G:
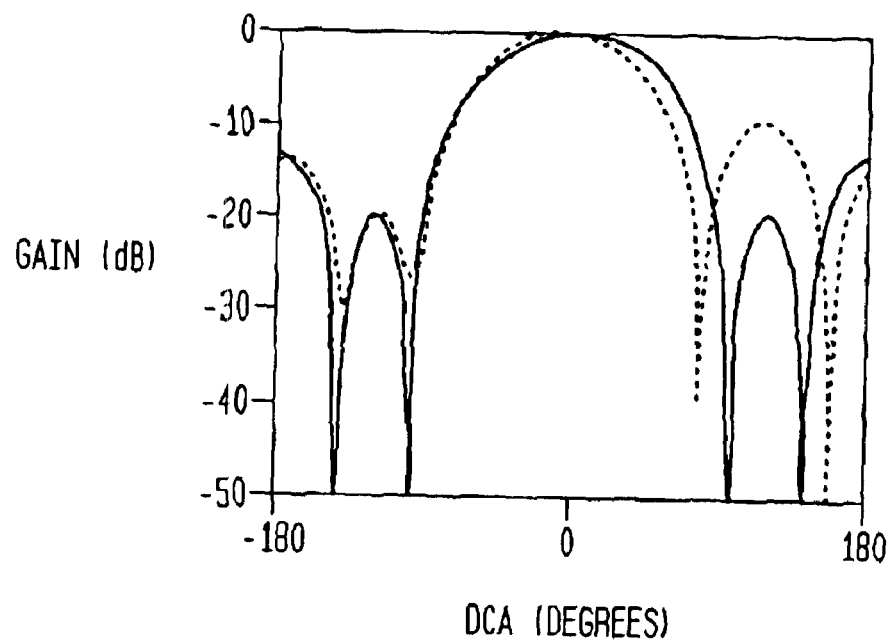
Figure 6H:
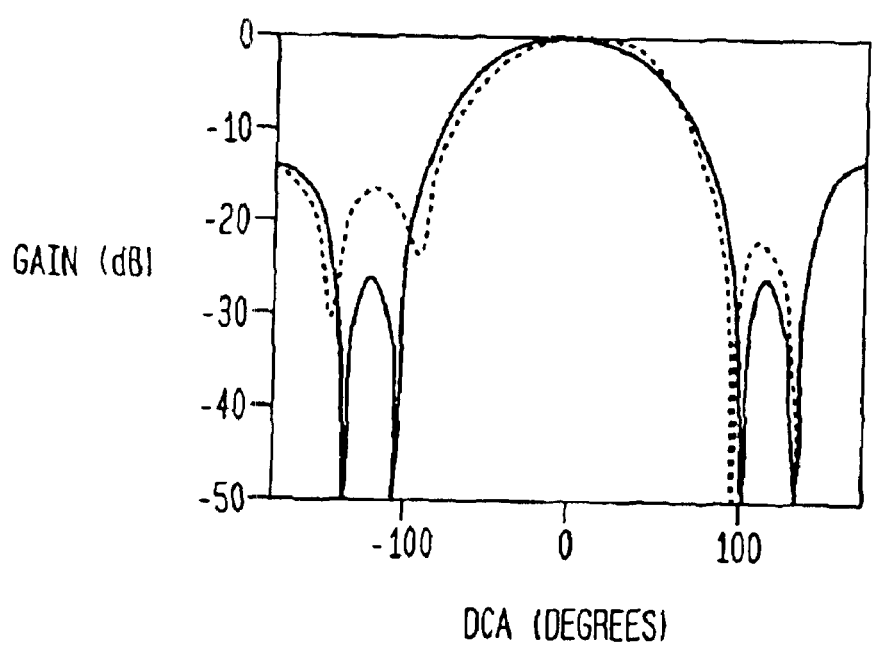

FIGS. 6A, 6B, and 6C show that system 10 maintains a more directed response when compared to the conventional beamformer system at frequencies corresponding to harmonics propagating from the look direction (i.e. 0 degrees). As shown in FIGS. 6D, 6E, and 6F, system 10 places deep nulls in the direction of harmonics from the louder T-72 at 74° at f=109.5 Hz and f=146.5 Hz. In addition, system 10 places deep nulls in the direction of a harmonic component f=134 Hz corresponding to the 2 ZILs that are at a bearing of 99° relative to the array. FIGS. 6G and 6H illustrate the difference of the system 10 response at two very closely spaced frequencies: f=146.5 corresponding to an interfering T72 at 74° and f=141 Hz corresponding to a harmonic component from the T-72 in interest. System 10 allows the acoustic sensors to obtain coverage narrow enough to pass harmonics corresponding to the target of interest and monitor the passage of the individual signal components into and out of the "trip line" steered to a fixed line of bearing angle.

It is to be understood that the specific embodiments of the invention that have been described are merely illustrative of certain application of the principle of the present invention. Numerous modifications may be made to the system and method for detecting extended range motion and counting moving objects using an acoustics microphone array invention described herein without departing from the spirit and scope of the present invention.

What is claimed is:

1. A method of detecting extended range motion and counting moving objects using an acoustics microphone array, the method comprising:
   using an optimized beamforming process to create a plurality of acoustic beams comprised of a plurality of focused listening directions;
   detecting the presence of one or more of a plurality of objects moving through the acoustic beams;
   verifying that the objects are valid objects to be counted; and
   verifying a plurality of valid directional information of the objects within the acoustic beams.

2. The method of claim 1, further comprising computing a power spectrum for each of a plurality of acoustic beams.

3. The method of claim 2, further comprising selecting a single loudest spectral component from a plurality of spectral components using a first beamforming process.

4. The method of claim 3, further comprising computing a bearing to each of the spectral components using the first beamforming process.

5. The method of claim 4, further comprising generating a steering vector for each of a plurality of principal azimuthal directions.

6. The method of claim 5, further comprising generating the steering vector for a trip line direction.

7. The method of claim 6, further comprising computing a correlation matrix with regularization at each of a plurality of frequencies using the spectral components across all the plurality of frequencies (step 620).

8. The method of claim 7, further comprising computing a plurality of optimum weight vectors (Block 425, step 625).

9. The method of claim 8, further comprising steering the beams and computing a beamformer output power in the principal direction and the trip line direction (Block 425, step 630).

10. The method of claim 9, further comprising computing a value of background noise for the plurality of frequencies (Block 425, step 635).

11. The method of claim 10, further comprising computing a signal to noise ration for each of the spectral components (Block 430).

12. The method of claim 11, further comprising designating a look direction beam by retaining the spectral components in each of the beams that are greater than a threshold (Block 445).

13. The method of claim 12, further comprising assigning a bearing to a plurality of retained spectral components (Block 450).

14. The method of claim 13, further comprising retaining a plurality of components that fall within a bearing tolerance of each of a plurality of beams in the look direction (Block 450).

15. The method of claim 14, further comprising counting a total number of the components in each of the look directions (Block 455).

16. The method of claim 15, further comprising incrementing a trip line event counter if the trip line event counter is not previously set and an adequate time delay has occurred since the last trip line event.

17. A system for detecting extended range motion and counting moving objects using an acoustics microphone array, the system comprising:
  means for using an optimized beamforming process to create a plurality of acoustic beams comprised of a plurality of focused listening directions;
  means for detecting the presence of one or more of a plurality of objects moving through the acoustic beams;
  means for verifying that the objects are valid objects to be counted; and
  means for verifying a plurality of valid directional information of the objects within the acoustic beams (Block 415).

18. The system of claim 17, further comprising means for computing a power spectrum for each of a plurality of acoustic beams.

19. The system of claim 18, further comprising means for selecting a single loudest spectral component from a plurality of spectral components using a first beamforming process (Block 420, step 535).

20. The system of claim 19, further comprising computing a bearing to each of the spectral components using the first beamforming process (Block 425, step 610).

21. A system having instruction codes for detecting extended range motion and counting moving objects using an acoustics microphone array, the system including a computer readable medium, and further comprising:
  a first set of instruction codes for using an optimized beamforming process to create a plurality of acoustic beams comprised of a plurality of focused listening directions;
  a second set of instruction codes for detecting the presence of one or more of a plurality of objects moving through the acoustic beams;
  a third set of instruction codes for verifying that the objects are valid objects to be counted; and
  a fourth set of instruction codes for verifying a plurality of valid directional information of the objects within the acoustic beams (Block 415).

22. The system of claim 21, further comprising a fifth set of instruction codes for computing a power spectrum for each of a plurality of acoustic beams.

23. The system of claim 22, further comprising a sixth set of instruction codes for selecting a single loudest spectral component from a plurality of spectral components using a first beamforming process Block (420, step 535).

24. The system of claim 23, further comprising a seventh set of instruction codes for computing a bearing to each of the spectral components using the first beamforming process Block (425, step 610).

25. The system of claim 24, further comprising an eight set of instruction codes for generating a steering vector for each of a plurality of principal azimuthal directions (Block 425, step 610).

\* \* \* \* \*